United States Patent
Wang et al.

(10) Patent No.: US 8,119,217 B2
(45) Date of Patent: Feb. 21, 2012

(54) OPTICAL RECORDING MEDIUM WITH INK RECEPTIVE COATING

(75) Inventors: Yongzhong Wang, Tucson, AZ (US); Hai Quang Tran, San Diego, CA (US); Jessica Huien Liao, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 12/391,400

(22) Filed: Feb. 24, 2009

(65) Prior Publication Data

US 2010/0215874 A1    Aug. 26, 2010

(51) Int. Cl.
*B32B 3/02* (2006.01)
(52) U.S. Cl. ............... 428/64.1; 428/64.4; 428/64.8; 430/270.14
(58) Field of Classification Search ............ 428/64.4
See application file for complete search history.

(56) References Cited

U.S. PATENT DOCUMENTS

| | | | |
|---|---|---|---|
| 6,096,469 A | 8/2000 | Anderson et al. | |
| 6,936,316 B2 | 8/2005 | Nigam et al. | |
| 7,275,818 B2 | 10/2007 | Figov et al. | |
| 7,399,507 B2 | 7/2008 | Bhatt et al. | |
| 7,416,297 B2 | 8/2008 | Figov | |
| 2003/0138608 A1 | 7/2003 | Landry-Coltrain et al. | |
| 2010/0098887 A1* | 4/2010 | Matsuishi et al. | 428/32.1 |
| 2010/0173104 A1* | 7/2010 | Kubota | 428/32.26 |

FOREIGN PATENT DOCUMENTS

| | | |
|---|---|---|
| EP | 1488932 A1 | 12/2004 |
| GB | 2410705 | 8/2005 |
| JP | 04189173 | 7/1992 |
| JP | 2006062262 | 3/2006 |
| JP | 2008105356 | 5/2008 |
| WO | WO2004/069551 | 8/2004 |
| WO | WO2006/096831 | 9/2006 |

* cited by examiner

*Primary Examiner* — Elizabeth Mulvaney

(57) ABSTRACT

The instant disclosure relates to an ink jet printable optical recording medium including a substrate having opposing surfaces, namely a recording surface and a printing surface. The printing surface of the substrate is coated with an adhesion promotion layer which includes polyurethane, a high surface area inorganic pigment having a surface area of at least 100 $m^2/g$, and a low surface area inorganic pigment having a surface area of at most 50 $m^2/g$. The adhesion promotion layer is coated with an ink receptive coating.

18 Claims, 1 Drawing Sheet

OPTICAL RECORDING MEDIUM WITH INK RECEPTIVE COATING

BACKGROUND

The present disclosure relates generally to an optical recording medium with an ink receptive coating.

Mass producers of CDs or DVDs have displayed visual information on a CD or DVD by printing indicia directly onto the surface of the disk. This may not be a viable method for those who occasionally create labeled disks. This may be the result of the prohibitive expense of the printing operation and the equipment needed to print directly on the discs.

In addition to this printing method, there are several other ways to display visual information about the content of a disk. For occasional users, CD labels are more convenient for labeling a disk. Various label manufacturers have produced adhesive labels that can be printed upon, removed from its backing, and placed on the surface of a disk. Systems for generating such labels may require a separate printing and aligning system—where the printer is used to print the label, and the separate alignment system is used to properly place the label on a disk.

BRIEF DESCRIPTION OF THE DRAWINGS

Features and advantages of embodiments of the present disclosure will become apparent by reference to the following detailed description and drawings, in which like reference numerals correspond to similar, though not necessarily identical, components. For the sake of brevity, reference numerals or features having a previously described function may not necessarily be described in connection with other drawings in which they appear.

DETAILED DESCRIPTION

Optical recording media are widely used to record digital information such as music, video, software, photo, and digital documents. Such optical recording media include compact discs (CD) and digital video discs (DVD). CDs and DVDs are generally classified into two types: a) those discs that are capable of a one time recording (write-once) and reproducing of digital information; and b) a rewritable type of disc capable of erasing recorded digital information therefrom and recording new digital information thereon (CD-RWs and DVD-RWs).

Conventional CDs or DVDs have a front surface (i.e., the light incidence side) and a back surface (i.e., the side opposite to the light incidence side). Devices are available that can both write digital information into a CD/DVD from the front surface, and print the back surface of the CD/DVD with ink jet inks. However, in order for ink jet inks to be used, the CD/DVDs include an ink jet ink receptive coating on their back surface. To be compatible with most ink jet inks, the ink receptive coating will usually be either a swellable-type or a porous-type ink receptive coating. The plastic surface of the CD/DVD (such as the typical CD/DVD polycarbonate surface) is hydrophobic, while most ink receptive coatings are hydrophilic. It has been found that the ink receptive coatings for either swellable-type or porous-type coatings tend to have poor coating adhesion to a CD/DVD surface. Furthermore, it is believed that since the porous-type ink receptive coating contains relatively less amount of binder than the swellable-type ink receptive coating, it tends to have even poorer adhesion to the CD/DVD back surface.

The embodiments of the optical recording medium disclosed herein include an ink receptive coating having improved adhesion to a substrate of the medium so that labels may readily be printed on the optical recording medium with an ink jet printer.

Figure 1:
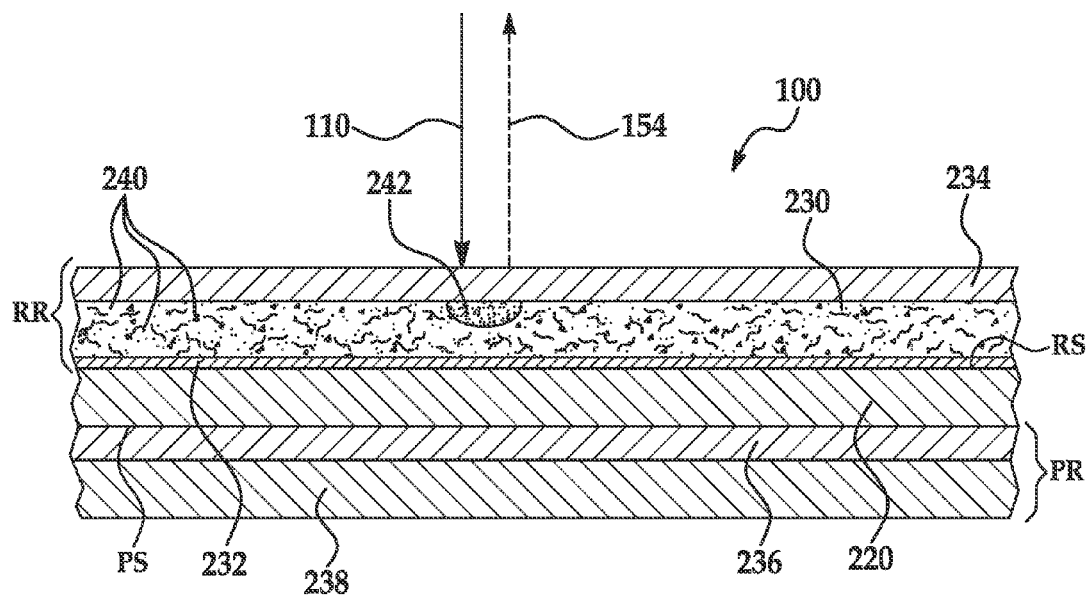
FIG. 1 is a cutaway cross-sectional view of an embodiment of an optical recording medium.
Figure 2:
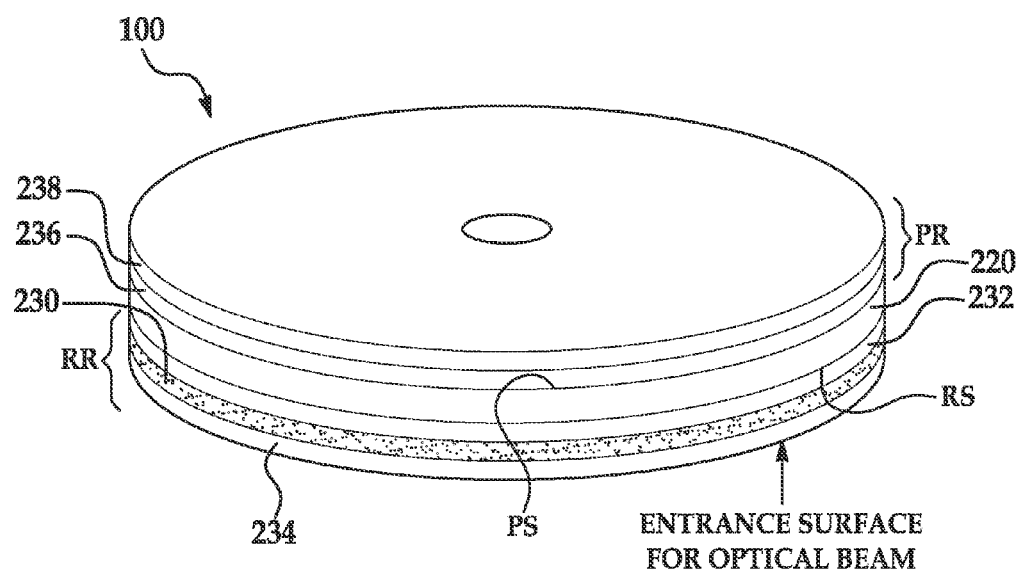
FIG. 2 is a perspective view of another embodiment of an optical recording medium.

Referring now to FIGS. 1 and 2 together, an optical recording medium 100 that is a write-once disc is depicted. Such a medium 100 typically contains a polycarbonate or other suitable substrate 220 that is coated with a dye coating layer 230, a metallized reflective layer 232, and a protective layer 234. A dye 240 in the dye coating layer 230 is destroyed by a writing laser beam 110 in a controlled fashion during the writing process. The destroyed dye forms a mark 242 having strong reflection capabilities, while the intact dye 240 has weak reflection capabilities. During the reading process, a low-power laser scans the dye coating layer 230. A sensor (not shown) monitors the intensity of the reflected light beam 154 from the medium 100, and in particular, distinguishes between the beams reflected by the marks 242 and the non-marked areas of the medium 100. The reflected beam(s) 154 is/are then converted into a digital data stream.

In the rewritable type of CD or DVD, the disc has a phase change layer coating instead of the dye coating layer 230. An amorphous phase component is used in the layer, and is similar to the dye 240 in the write-once disc. In the rewritable disc however, the amorphous phase component changes into a crystalline phase component when exposed to a writing laser beam 110 in a controlled fashion during the writing process. The crystalline phase component has strong reflection capabilities, thus establishing a mark 242. Any non-marked portions include the amorphous phase component, and thus have weak reflection capabilities. The difference between the intensity of reflected light in the crystalline and amorphous phases can be converted into a digital data stream by the method described above.

When a CD or DVD is recorded with information, it is desirable for users of the CD or DVD to be able to tell what kind of information is recorded on each disk without playing or reproducing the recorded information.

Embodiments of the medium 100 disclosed herein include an adhesion promotion layer 236 that bonds well to both the surface of the CD/DVD substrate 220 and an ink receptive coating 238, which may be either a porous-type or a swellable-type ink receptive coating 238. The adhesion promotion layer 236 advantageously enables the ink receptive coating 238 to adhere well to the substrate 220. Furthermore, the optical recording medium 100 disclosed herein may be printed upon with an ink jet printer and exhibits fast ink drying characteristics.

The optical recording medium 100 disclosed herein can be various CDs or DVDs including write-once and rewritable types. The medium 100 includes the substrate 220, which has a recording surface RS and a printing surface PS. It is to be understood that recording and printing do not occur directly on or in the substrate 220, but rather occur on or in layers established thereon. For example, recording to the medium 100 is accomplished by writing information to the coating layer 230 via one of the methods previously described. Similarly, printing on the medium 100 takes place on or in the ink receptive coating 238 established directly or indirectly on the printing surface PS of the substrate 220. As such, the medium includes a printing region PR (including layers established on the printing surface PS) and a recording region RR (including layers established on the recording surface RS).

The substrate 220 for the medium 100 may be any substrate upon which it is desirable to make a mark 242, such as, for example, the polymeric substrate used in conventional CD-R/RW/ROM, DVD±R/RW/ROM, HD-DVD or BLU-RAY discs. Substrate 220 may be paper (e.g., labels, tickets, receipts, or stationery), an overhead transparency, or another surface upon which it is desirable to record marks 242. The substrate 220 may also include one or more grooves (not shown) formed therein. In an embodiment, multiple concentric grooves are formed in the substrate 220. In another embodiment, a single spiral groove extending from an inner diameter to an outer diameter is formed in the substrate 220. In still another embodiment, a combination of concentric and spiral grooves are formed in the substrate 220 (e.g., multiple separate spiral grooves are formed in the substrate 220).

The recording surface RS of the substrate 220 includes the dye coating 230, which enables the medium 100 to be written to. In one embodiment, the recording surface RS of substrate 220 has the reflective layer 231 established directly thereon. The reflective layer 231 is usually formed of, for example, Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn, Si, and/or Nd. In still another embodiment, the recording surface RS may also include a plastic or other suitable protective layer 234 established on the dye coating layer 230. Non-limiting examples of other suitable protective layers 234 include $SiO_2$ and $Si_3N_4$. The protective layer(s) 234 enable writing to the coating 230 and reading of the mark(s) 242 while protecting the coating 230 from scratching, dirt, etc.

In the embodiments disclosed herein, the adhesion promotion layer 236 is first applied onto the printing surface PS of the substrate 220. As mentioned hereinabove, the printing surface PS is positioned opposite to the recording surface RS of the substrate 220. The ink receptive coating 238 is then applied on top of the adhesion promotion layer 236.

In a non-limiting embodiment, the adhesion promotion layer 236 includes a binder, a pigment and coating additives, such as a defoaming agent and a wetting agent. The binder used in the adhesion promotion layer 236 may be selected from polyurethane and derivatives thereof, including aliphatic polyurethane, aromatic polyurethane, urethane-acrylic copolymer, and oil-modified urethane. In one embodiment, an aliphatic polyurethane binder is selected as the binder. The amount of binder in the adhesion promotion layer 236 ranges from 40% to 90% by dry weight of the adhesion promotion layer 236.

The adhesion promotion layer 236 also includes at least one high surface area inorganic pigment and at least one low surface area inorganic pigment. The high surface area inorganic pigment is selected from pigments with a surface area of 100 $m^2/g$ or higher. Non-limiting examples of the high surface area inorganic pigment include precipitated silica, fumed silica, silica gel, alumina, engineered clay, and combinations thereof. In one embodiment, fumed silica is selected as the high surface area pigment. In yet a further embodiment, the amount of the high surface area inorganic pigment ranges from 0.1% to 5.0% dry weight of the adhesion promotion layer 236.

The low surface area inorganic pigment is selected from pigments with a surface area of 50 $m^2/g$ or lower. Non-limiting examples of the low surface area inorganic pigment include titanium dioxide, clay, calcium carbonate, calcium sulfate, zinc sulfate, barium sulfate, barium carbonate, and combinations thereof. It is to be understood that the low surface area inorganic pigment may be selected to increase the opacity of the adhesion promotion layer 236 as needed or desired. In one embodiment, titanium dioxide is selected as the low surface area inorganic pigment. In yet a further embodiment, the amount of low surface area inorganic pigment ranges from 10.0% to 60.0% dry weight of the adhesion promotion layer 236.

The adhesion promotion layer 236 may be applied to the printing surface PS with a screen printing method, a spin coating method, or any other coating methods suitable for depositing on rigid surfaces. In an embodiment, the adhesion promotion layer 236 has a coating weight ranging from about 1 to 20 $g/m^2$; and the thickness of the adhesion promotion layer 236 ranges from about 0.5 microns to 20 microns.

The ink receptive coating 238 is applied on an exposed surface of the adhesion promotion layer 236. The ink receptive coating 238 may be a swellable-type or a porous-type ink receptive coating 238. In an embodiment, the ink receptive coating 238 usually includes binder(s), pigment(s), wetting agent(s), de-foaming agent(s), and/or other processing aides. In any of the embodiments disclosed herein, the ratio of pigment to binder in the ink receptive coating 238 ranges from about 1:1 to 10:1.

In the swellable-type ink receptive coating 238, the ink is mainly absorbed via the swelling of the ink receptive coating 238. In an embodiment, the binder in the swellable-type ink receptive coating 238 is more than 50% of the dry weight of the ink receptive coating 238.

In the porous-type ink receptive coating 238, the ink is mainly absorbed via micropores of the ink receptive coating 238 by virtue of microcapillary forces. The pigment in the porous-type ink receptive coating 238 is normally proportionately a large amount of the total components in the ink receptive coating 238. For example, in an embodiment, pigment makes up more than 50% of dry weight of the ink receptive coating 238.

In an embodiment, the binder for both swellable-type and porous-type ink jet ink receptive coatings 238 is selected from compounds known in the art including gelatin, casein, starch, collagen, polyurethane, polyvinyl alcohol and derivatives thereof, polyvinyl pyrrolidone and derivatives thereof, cellulose ether and derivatives thereof, polyethylene oxide, polystyrene, acrylic and derivatives thereof, polyvinyl acetate, styrene-acrylic copolymers, and combinations thereof. In an embodiment, the binder is selected from polyvinyl alcohol and its derivatives.

In another embodiment, the pigments for both swellable-type and porous-type ink receptive coating 238 is selected from pigments known in the art including silica, alumina, clay, calcium carbonate, kaolin, titanium oxide, zinc oxide, aluminosilicate, boehmite, zirconium oxide, and combinations thereof. In a further embodiment, the pigment is selected from silica, alumina, alumina hydrate, aluminum silicate, and combinations thereof. It is to be understood that such pigments could also be chemically modified for enhancing printing quality and/or process stability.

In an embodiment, the ink receptive coating 238 is a porous-type ink receptive coating 238 including polyvinyl alcohol as the binder. In this non-limiting example, the pigment is chosen from silica, surface treated silica, alumina and boehmite. In this and other embodiments, the coating weight of the ink receptive coating 238 may range from about 5 to 40 $g/m^2$.

It is to be understood that in some embodiments, the adhesion promotion layer 236 and ink receptive coating 238 may further contain wetting agent(s), de-foaming agent(s), anti-foaming agent(s), and/or other processing aids. When included, the concentration of the wetting agent typically ranges from about 0.1% to 3% of the total weight of the coating 238. In a further embodiment, the concentration of the wetting agent may range from about 0.5% to 1.5% of the total weight of the coating 238. When included, the concentration of the de-foaming agent typically ranges from about 0.1% to 2% of the total weight of the coating 238. In a further embodiment, the concentration of the de-foaming agent may range from about 0.2% to 1.5% of the total weight of the coating 238.

The adhesion promotion layer 236 and the ink receptive coating 238 may be cross-linked to provide desirable features, such as coating adhesion, coating strength, water-fastness and non-blocking characteristics. In an embodiment, the cross-linking agent for a particular binder can be selected from those known in the art. In a non-limiting example, the polyurethane binder can be cross-linked with carbodiimides, isocyanates (e.g., Bayer's Bayhydur® 302), polyaziridines (e.g., Bayer's Xama®-7), melamines, and epoxies. In another non-limiting example, the polyvinyl alcohol binder can be cross-linked by aldehydes (e.g., glyoxal), urea-formaldehyde, melamineformaldehyde, salts of multivalent anions (e.g., Bacote®-20, a solution of zirconium ammonium carbonate), polyamide epichlorohydrin (e.g., Hercules' Polycup® 172), and boric acid or borate derivatives.

To further illustrate embodiment(s) of the instant disclosure, various examples are given herein. It is to be understood that these are provided for illustrative purposes and are not to be construed as limiting the scope of the disclosed embodiment(s). Where units are given as "parts" in the examples, it is to be understood that such units are all in weight parts, unless specified otherwise.

EXAMPLE 1

An adhesion promotion layer slurry was prepared according to an embodiment disclosed herein by adding together the following components:

| Component | Amount |
| --- | --- |
| Polyurethane (35% solid) | 85 to 90 parts |
| Fumed silica | <0.5 parts |
| Wetting agent | <1 parts |
| Isoproponal | 5 to 10 parts |
| Titanium Dioxide | 5 to 10 parts |
| De-foaming agent | <0.5 parts |

The adhesion promotion layer slurry was coated onto a DVD polycarbonate substrate. It was found that the adhesion of the coating to the substrate was good. The coating could not be removed with a piece of Scotch® tape.

EXAMPLE 2

An adhesion promotion layer slurry was prepared according to an embodiment disclosed herein by adding together the following components:

| Component | Amount |
| --- | --- |
| Polyurethane (35% solid) | 75 to 80 parts |
| Fumed silica | <0.5 parts |
| Wetting agent | <1 parts |
| Isoproponal | 5 to 10 parts |
| Titanium dioxide | 10 to 15 parts |
| De-foaming agent | <0.5 parts |

The adhesion promotion layer slurry was spin coated on a DVD polycarbonate substrate printing surface (using G3P Spincoat from Specialty Coating Systems). The adhesion promotion layer had a thickness of around 10 microns. It was found that the adhesion promotion layer adhesion to the printing surface was excellent. In particular, the adhesion promotion layer of EXAMPLE 2 could not be removed with a piece of Scotch® tape.

An ink receptive coating slurry was prepared according to an embodiment disclosed herein by adding together the following components:

| Component | Amount |
| --- | --- |
| Treated fumed silica | 55 to 60 parts |
| Boric acid | <0.5 parts |
| Glycerol | <0.5 parts |
| Wetting agent | <0.5 parts |
| Polyvinyl alcohol (12.3% solution) | 25 parts |
| De-foaming agent | <0.5 parts |

The ink receptive coating was coated once on top of the adhesion promotion layer by a screen printing method with #196 meshes. The thickness of the ink receptive coating was around 10 microns. It was found that the ink receptive coating had excellent adhesion to the adhesion promotion layer. It could not be removed by a piece of Scotch® tape.

EXAMPLE 3

EXAMPLE 3 is the same as EXAMPLE 2 except that the ink receptive coating was coated twice on top of the adhesion promotion layer by a screen printing method with #196 meshes. The thickness of the ink receptive coating in EXAMPLE 3 was around 20 microns. It was found that the ink receptive coating had excellent adhesion to the adhesion promotion layer. The ink receptive coating 238 could not be removed by a piece of Scotch® tape.

COMPARATIVE EXAMPLE 1

A comparative adhesion promotion layer slurry was prepared by adding together the following components:

| Component | Amount |
| --- | --- |
| Rhoplex B88 | 50 to 55 parts |
| Water | 45 to 50 parts |
| Fumed silica | <0.5 parts |
| Wetting agent | <0.5 parts |
| Isopropanol | <5 parts |

It was found that the adhesion promotion layer in COMPARATIVE EXAMPLE 1 had poor adhesion to a DVD substrate printing surface. The adhesion promotion layer could be removed with a piece of Scotch® tape.

COMPARATIVE EXAMPLE 2

An ink receptive coating slurry was made the same as the ink receptive coating of EXAMPLE 2, but was directly coated on a DVD polycarbonate substrate printing surface. It was found that the adhesion of the ink receptive coating to the DVD substrate printing surface was poor. The ink receptive coating could be removed with a piece of Scotch® tape.

The results of EXAMPLES 1-3 and COMPARATIVE EXAMPLES 1-2 were compared and tabulated in Table 1 below.

TABLE 1

Adhesion of the two coating layers

| | Adhesion Promotion Layer | Ink Receptive Coating |
|---|---|---|
| Example 1 | Excellent | n/a |
| Example 2 | Excellent | Good |
| Example 3 | Excellent | Good |
| Comparative Example 1 | Poor | n/a |
| Comparative Example 2 | n/a | Very poor |

As shown in the results, the adhesion promotion layer of the embodiments disclosed herein (i.e., Examples 1-3) adheres well to DVD polycarbonate substrates, while the ink receptive coating of the embodiments disclosed herein adheres well to the adhesion promotion layer.

While several embodiments have been described in detail, it will be apparent to those skilled in the art that the disclosed embodiments may be modified. Therefore, the foregoing description is to be considered exemplary rather than limiting.

What is claimed is:

1. An ink jet printable optical recording medium, comprising:
    an optical recording substrate including opposing surfaces, the opposing surfaces being a recording surface and a printing surface;
    an adhesion promotion layer established on the printing surface of the substrate, the adhesion promotion layer including a polyurethane-based component, a high surface area inorganic pigment having a surface area of at least 100 $m^2/g$, and a low surface area inorganic pigment having a surface area of at most 50 $m^2/g$; and
    an ink receptive coating established on the adhesion promotion layer, the ink receptive coating including a pigment and a binder.

2. The ink jet printable optical recording medium of claim 1 wherein the polyurethane-based component is selected from the group consisting of aliphatic polyurethane, aromatic polyurethane, urethane-acrylic copolymer, oil-modified urethane and combinations thereof; and wherein the high surface area inorganic pigment is selected from the group consisting of precipitated silica, fumed silica, silica gel, alumina, engineered clay and combinations thereof; and wherein the low surface area inorganic pigment is selected from the group consisting of titanium dioxide, clay, calcium carbonate, calcium sulfate, zinc sulfate, barium sulfate, barium carbonate, and combinations thereof.

3. The ink jet printable optical recording medium of claim 1 wherein the adhesion promotion layer has a coating weight ranging from 1 to 20 $g/m^2$; wherein the high surface area inorganic pigment is from 0.1% to 5% dry weight of the adhesion promotion layer; and wherein the low surface area inorganic pigment is from 10% to 60% dry weight of the adhesion promotion layer.

4. The ink jet printable optical recording medium of claim 1 wherein the high surface area inorganic pigment is fumed silica.

5. The ink jet printable optical recording medium of claim 1 wherein the low surface area inorganic pigment is titanium dioxide.

6. The ink jet printable optical recording medium of claim 1 wherein the ink receptive coating is a porous ink jet coating ranging from 10 to 40 $g/m^2$.

7. The ink jet printable optical recording medium of claim 6 wherein the ink receptive coating includes polyvinyl alcohol as the binder and fumed silica as the pigment.

8. The ink jet printable optical recording medium of claim 1 wherein the polyurethane-based component is aliphatic polyurethane.

9. A method of making an ink jet printable optical recording medium, the method comprising:
    applying an adhesion promotion layer to a printing surface of a substrate, the printing surface being opposite to a recording surface; and
    applying an ink receptive coating on the adhesion promotion layer;
    wherein the adhesion promotion layer includes a polyurethane-based component, a high surface area inorganic pigment having a surface area of at least 100 $m^2/g$, and a low surface area inorganic pigment having a surface area of at most 50 $m^2/g$, and wherein the ink receptive coating includes a binder and a pigment.

10. The method of claim 9 wherein the polyurethane-based component is selected from the group consisting of aliphatic polyurethane, aromatic polyurethane, urethane-acrylic copolymer, oil-modified urethane and combinations thereof; wherein the high surface area inorganic pigment is selected from the group consisting of precipitated silica, fumed silica, silica gel, alumina, engineered clay and combinations thereof; and wherein the low surface area inorganic pigment is selected from the group consisting of titanium dioxide, clay, calcium carbonate, calcium sulfate, zinc sulfate, barium sulfate, barium carbonate, and combinations thereof.

11. The method of claim 9 wherein the adhesion promotion layer has a coating weight ranging from 1 to 20 $g/m^2$; wherein the high surface area inorganic pigment is from 0.1% to 5% dry weight of the adhesion promotion layer; and wherein the low surface area inorganic pigment is from 10% to 60% dry weight of the adhesion promotion layer.

12. The method of claim 9 wherein the high surface area inorganic pigment is fumed silica.

13. The method of claim 9 wherein the low surface area inorganic pigment is titanium dioxide.

14. The method of claim 9 wherein the ink receptive coating is a porous ink receptive coating ranging from 10 to 40 $g/m^2$.

15. The method of claim 14 wherein the ink receptive coating includes polyvinyl alcohol as the binder and fumed silica as the pigment.

16. The method of claim 9 wherein the polyurethane-based component is aliphatic polyurethane.

17. A system for making an ink jet printable optical recording medium, the method comprising:
    an optical recording substrate including opposing surfaces, the opposing surfaces being a recording surface and a printing surface;
    a first media coating device for applying an adhesion promotion layer to the printing surface of the substrate, the adhesion promotion layer including a polyurethane-based component, a high surface area inorganic pigment having a surface area of at least 100 $m^2/g$, and a low surface area inorganic pigment having a surface area of at most 50 $m^2/g$; and
    a second media coating device for applying an ink receptive coating to the adhesion promotion layer, the ink receptive coating including a binder and a pigment.

18. The ink jet printable optical recording medium of claim 1 wherein the binder is selected from gelatin, casein, starch, collagen, polyurethane, polyvinyl alcohol and derivatives thereof, polyvinyl pyrrolidone and derivatives thereof, cellulose ether and derivatives thereof, polyethylene oxide, polystyrene, acrylic and derivatives thereof, polyvinyl acetate, styrene-acrylic copolymers, and combinations thereof; and wherein the pigment is selected from silica, alumina, clay, calcium carbonate, kaolin, titanium oxide, zinc oxide, aluminosilicate, boehmite, zirconium oxide, and combinations thereof.

* * * * *